Dec. 7, 1937.  D. VERMETTE  2,101,484
CLUTCH MECHANISM
Filed May 10, 1937

Inventor
Denis Vermette
By Albert Fournier
Attorney

Patented Dec. 7, 1937

2,101,484

UNITED STATES PATENT OFFICE 2,101,484

CLUTCH MECHANISM

Denis Vermette, Montreal, Quebec, Canada

Application May 10, 1937, Serial No. 141,720

1 Claim. (Cl. 192—48)

The present invention pertains to a novel clutch mechanism having a variety of uses as will be hereinafter fully described. The principal object of the invention is to provide a simple and inexpensive construction of this character.

In general, the invention embodies two shafts with an intermediate member which is preferably in the form of a gear. In the preferred form, the invention adapts the gear to be coupled to either one or both of the shafts. In such case, the power may be applied to the gear and delivered to either one or both of the shafts, or either shaft may be power driven and the gear connected to a driven apparatus. Also, the gear may be merely an idler serving as a coupling between the two shafts, one of which may be driving and the other driven.

More specifically, each side of the gear carries a clutch element, and the shaft adjacent thereto is formed as a complementary clutch element. Preferably, the first-named elements are in the form of bosses ribed externally and receiving reduced ends of the adjacent shafts. In such case the adjacent parts of the shaft are similarly ribbed.

Associated with each pair of complemetary clutch elements is a clutching member. In the preferred construction, this member is slidable and internally ribbed to connect the complementary clutch elements. The coupling members are separately actuated so that either shaft or both shafts may be clutched, as desired.

The invention further embodies a preferred mechanism for actuating the coupling members. This mechanism, as illustrated and described herein, normally clutches one shaft and declutches the other and is readily adapted for operation from a remote point.

The invention is fully disclosed by way of example by the following description and the accompanying drawing, in which Figure 1 is a plan section of the device;

Reference to these views will now be made by use of like characters that are employed to designate corresponding parts throughout.

Figure 1:
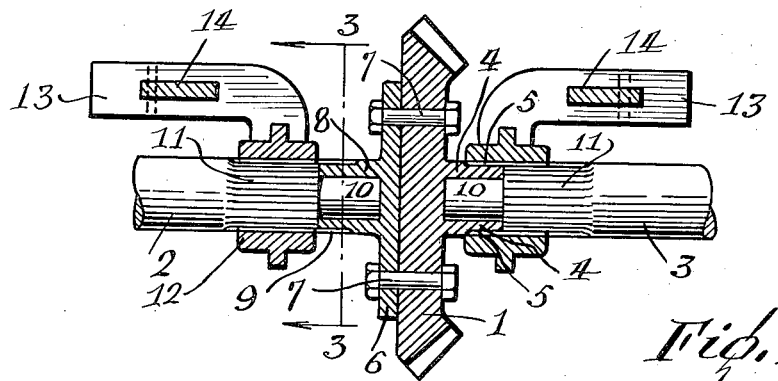

In Figure 1 is shown a main gear 1 which may be a driven gear or which may serve as a clutch between two shafts, as will presently be described. At opposite sides of the gear are aligned shafts 2 and 3. The gear 1, if a driven gear, may transmit power to either of the shafts; or if either of the shafts is a drive shaft, the gear 1 may transmit power from one to the other. Also, if the gear 1 is a driving gear, it may transmit power to both shafts 2 and 3 at the same time.

At one side of the gear 1 is formed an integral clutch member in the form of a co-axial boss 4 with ribs 5 or an equivalent clutch surface formed thereon. A similar construction is provided at the other side of the gear 1, and is preferably in the form of a plate 6 attached to the gear by bolts 7, the plate being formed with a boss 8 coaxial with the gear and having ribs 9 or an equivalent clutch surface formed thereon. The bosses, as well as the gear 1 and plate 6, lie between the ends of the aligned shafts 2 and 3. Preferably, the inner ends of the shafts are reduced at 10 and received within the bosses as clearly illustrated in Figure 1. Each shaft is formed with ribs 11 or an equivalent clutch surface immediately adjacent to its reduced end 5 and adapted to align with the ribs 5 adjacent to the shaft 3 or the ribs 9 adjacent to shaft 2.

It is now evident that a coupling member between each boss and the adjacent shaft 2 or 3 will serve to connect the shafts selectively or together to the gear 1 or to couple the shafts through the gear 1. Such a coupling member is provided in the form of internally ribbed collars 12 slidable over the adjacent ribbed surfaces of the adjacent bosses and shafts. From each such collar extends a shifting arm 13 adapted to be actuated in any desired manner but preferably by the means described herein.

Through each arm 13 is slidably passed a shifting plate 14 mounted in guides 15 for rectilinear movement transversely of the corresponding arm 13. Each plate has an inclined slot 16 receiving a roller 17 carried by the corresponding arm 13. The slots 16 are parallel for a purpose that will presently appear.

Figure 2:
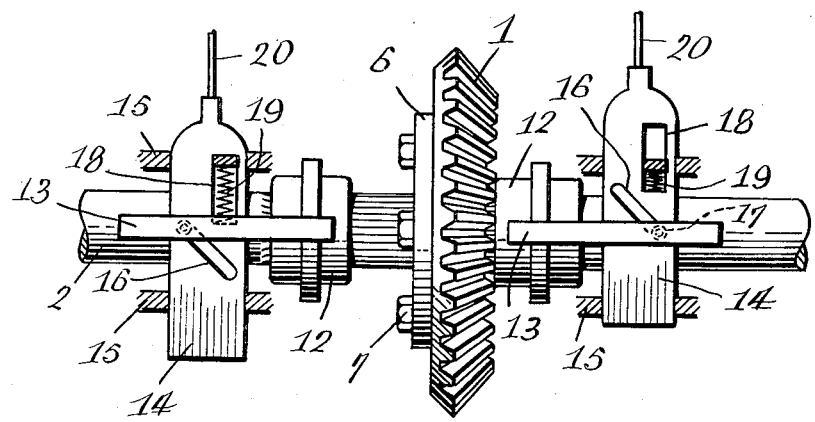
Figure 2 is a side elevation.
Figure 3:
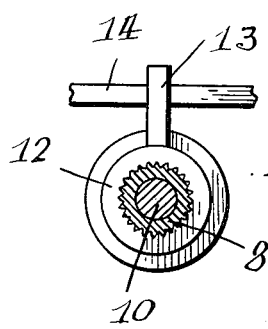
Figure 3 is a section on the line 3—3 of Figure 1.
Figure 4:
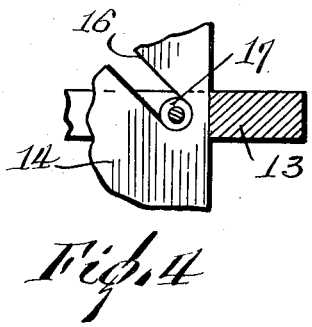
Figure 4 is an enlarged detail of Figure 2.

Each plate 14 also has a lengthwise slot 18 containing a spring 19 seated therein and bearing against one of the guides 15. Because of the parallel relation of the slots 16, the normal expansion of the spring at one side of the gear 1 disengages the corresponding clutch, while the normal expansion of the spring in the other side engages the corresponding clutch, as may be seen in Figure 2. For example, the clutch embodying the boss 8 and ribs 9 is disengaged by expansion of the spring at that side, and the other clutch is disengaged by compression of the corresponding spring, as illustrated.

Each plate 14 further has an operating link 20 extending to a remote point of control.

The mechanism described herein is capable of several different uses. If the gear 1 is connected to a source of power, it may be coupled selectively to either of the shafts 2 and 3 or to both together or may run freely as an idle gear not connected to either shaft. If either of the shafts is power driven, the mechanism may be employed to connect it to the other shaft.

Although a specific embodiment of the invention has been illustrated and described, it will be understood that various alterations in the details of construction may be made without departing from the scope of the invention, as indicated by the appended claim.

What I claim is:

In combination with a pair of shafts having clutch elements formed thereon, an intermediate member between said shafts, clutch members formed at opposite sides of said intermediate member and complementary to the first-named clutch elements, a coupling device associated with each clutch element and the complementary clutch member, an arm extending from each coupling device, a guided shifting plate slidable transversely through each arm, each plate having an oblique slot, an extension from each arm into the corresponding slot, and means for separately sliding said plates, springs associated with said plates and adapted to move each plate in a given direction, one spring being adapted to move its plate in the clutching direction and the other to move its plate in the declutching direction.

DENIS VERMETTE.